United States Patent [19]

Browning

[11] Patent Number: 5,205,794

[45] Date of Patent: * Apr. 27, 1993

[54] SHIFT MECHANISM FOR BICYCLE

[75] Inventor: Bruce W. Browning, Seattle, Wash.

[73] Assignee: Bicycle Partnership #1, Bainbridge Island, Wash.

[ * ] Notice: The portion of the term of this patent subsequent to Mar. 24, 2007 has been disclaimed.

[21] Appl. No.: 551,211

[22] Filed: Nov. 14, 1983

[51] Int. Cl.⁵ .............................................. F16H 55/12
[52] U.S. Cl. .................................... 474/160; 474/162; 474/77; 74/348
[58] Field of Search .......................... 74/348, 349, 341; 474/77, 160, 152, 162

[56] References Cited

U.S. PATENT DOCUMENTS 4,127,038 11/1978 Browning ........................ 474/160 X Primary Examiner—James A. Leppink
Assistant Examiner—Frank McKenzie
Attorney, Agent, or Firm—Seed and Berry

[57] ABSTRACT

A shift mechanism for a bicycle and the like wherein a chain is shifted from sprocket to sprocket by an operator controlling a lever to position a camming surface to direct a guide pawl to tilt a segment of one sprocket whereby the tilted segment aligns with a nontilted sprocket during chain shifting.

11 Claims, 6 Drawing Sheets

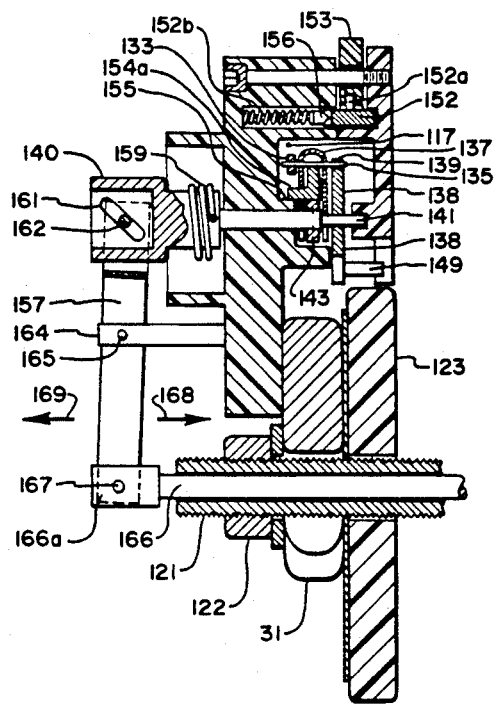
FIG. 15
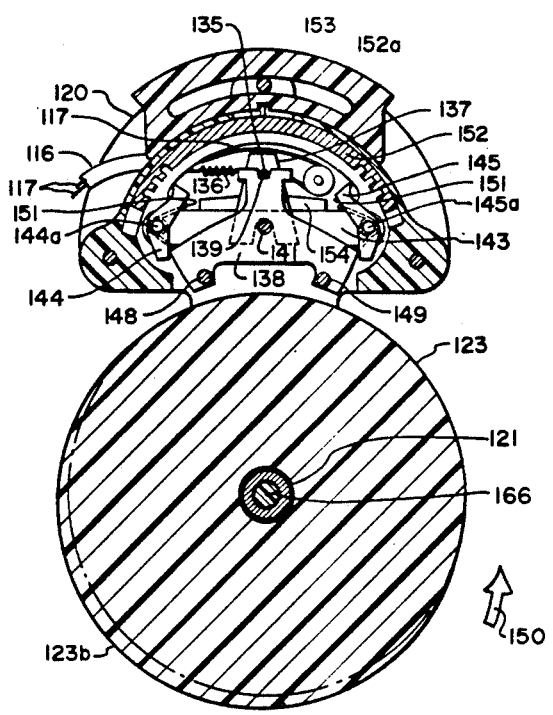
FIG. 16
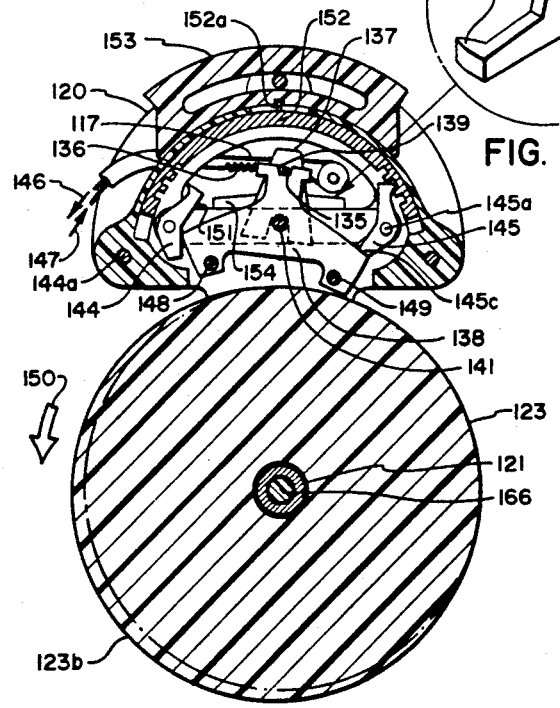
FIG. 17
FIG. 17A
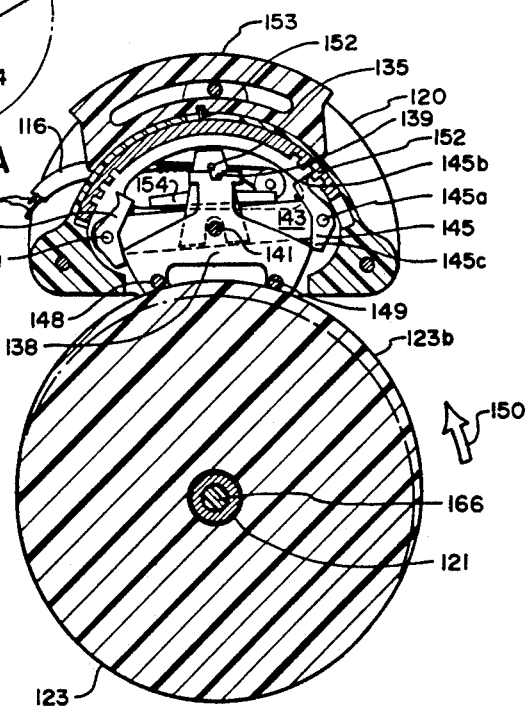
FIG. 18

SHIFT MECHANISM FOR BICYCLE

SUMMARY OF THE INVENTION

1. Field of the Invention

This invention relates to means for shifting a chain from a sprocket of one diameter to a sprocket of another diameter as a means of providing a different selected drive ratio. It is particularly related to drive sprocket assemblies having split or tilting sprockets such that a portion of a tilting sprocket will align with a portion of a nontilted sprocket and with the shifting of a chain from one sprocket of the assembly to another.

2. Prior Art

The advantages of and need for variable speed chain and sprocket assemblies has long been recognized. U.S. Pat. Nos. 3,448,628 and 3,583,249 show derailleur mechanisms of the type commonly found on bicycles for the purpose of shifting a chain from sprocket to sprocket in a cluster of sprockets having different diameters, for example. Other devices, such as those shown in U.S. Pat. Nos. 3,798,989, 3,861,226 and 3,800,613 show mechanisms where the effective diameter of a compound sprocket is varied to achieve different speed ratios.

In my U.S. Pat. No. 4,127,038, there is shown a sprocket shift assembly wherein a chain is moved from sprocket to sprocket, with the sprockets being of different diameter, while maintaining a positive drive connection during shifting by tilting a portion of a transferring sprocket to align with the teeth of a chain carrying sprocket to receive the chain before resuming the untilted position with the chain then carried thereby.

With the development of the shifting assembly that will permit a positive connection between host sprocket, chain and receiving sprocket there has developed a need for a positive mechanical shift mechanism to selectively effect the chain transfer from sprocket to sprocket.

OBJECTS OF THE INVENTION

Principal objects of the present invention are to provide a mechanical sprocket shift assembly that will reliably effect chain shifting from one sprocket to another sprocket in a sprocket cluster, wherein portions of individual sprockets will tilt into alignment with other sprockets to either transfer or receive a drive chain.

Other objects are to provide a sprocket shift assembly that is easily operated, reliable, compact and that can be effectively used with sprocket arrangements having any desired number of sprockets as a drive assembly for bicycles and the like.

Still another object is to provide a universal method of aligning teeth and notches in transfering and receiving sprockets to effect continuous drive action.

Further objects are to provide a shift assembly wherein the moving parts are balanced in such a manner as to be immune from the shocks of the road and yet require a very small mechanical force to effect the operation therein permitting either hand operation as described herein or "automatic" operation.

PRINCIPAL FEATURES OF THE INVENTION

Principal features of the invention include the use of a guide channel through which a pawl is travelled, with the position of pivoted sprocket segments and subsequent positioning of a chain relative to the sprockets of a sprocket assembly being determined by positioning of the guide channel. The guide channel is varied to change travel and rotation of the pawl to pivot the sprocket segments.

The guide channel is changed by pivoting inner or outer cam surfaces forming portions of the walls of the guide channel to block and direct travel of the pawl.

In a first sprocket assembly a cam surface forming a portion of a guide channel wall is released by linkages actuated by single operator controlled cable and is spring biased to an alternate position. A pawl travelling through the channel is pivoted in accordance with the path travelled and thus pivots the sprocket segments so that chain movement from sprocket to sprocket will occur.

In another sprocket assembly a spring biased cam surface forming a portion of a guide channel wall is released by a linkage actuated by an endless cable and a cam disc.

The pivoted sprocket segments are formed by breaking them out of the socket and with the break line so formed being staggered, if necessary, through teeth and notches of adjacent sprockets.

Additional objects and features of the invention will become apparent from the following drawings, detailed description and claims.

THE DRAWING

In the drawing:

FIG. 1 is a perspective view of a bicycle equipped with a shift assembly of the present invention;

FIG. 2, an enlarged fragmentary perspective view of the shift levers of the shift assembly;

FIG. 3, perspective view of the drive sprocket cluster of the shift assembly;

FIG. 4, a cross-sectional view, taken on the line 4—4 of FIG. 3;

FIG. 4A, an enlarged, fragmentary cross-sectional view of the hinge shown in FIG. 4.

FIG. 5, a view like FIG. 4, but showing the sprocket sectors shifted in one direction for shifting the chain from a smaller sprocket to a larger sprocket;

FIG. 6, a view like that of FIG. 5, but showing the sprocket sectors shifted in an opposite direction for shifting the chain from a larger sprocket to a smaller sprocket;

FIG. 7, an elevation view of the drive sprocket cluster;

FIG. 8, an enlarged, exploded perspective view of the internal working components of the drive sprocket control case;

FIG. 9, an enlarged front elevation view of the components of FIG. 8;

FIG. 10, a front elevation view of the rear wheel sprockets and control housing, with the decorator cover removed;

FIG. 11, a side elevation view of the sprockets and housing of FIG. 10;

FIG. 12, a perspective view of the rear wheel sprockets and control housing;

FIG. 13, an enlarged view like that of FIG. 12, partially broken away to show interior components;

FIG. 14, an enlarged sectional view, taken on the line 14—14 of FIG. 11;

FIG. 15, sectional view taken on the line 15—15 of FIG. 12;

FIG. 16, an enlarged sectional view taken on the line 16—16 of FIG. 11;

FIG. 17, a view like that of FIG. 16, but with the connecting yoke pivoted;

FIG. 17A, an enlarged perspective view of the disconnect yoke;

FIG. 18, a view like that of FIG. 16 and 17, but showing the chain retainer cam rotated and the connecting yoke riding on the cam surface.

DETAILED DESCRIPTION OF THE INVENTION

Figure 1:
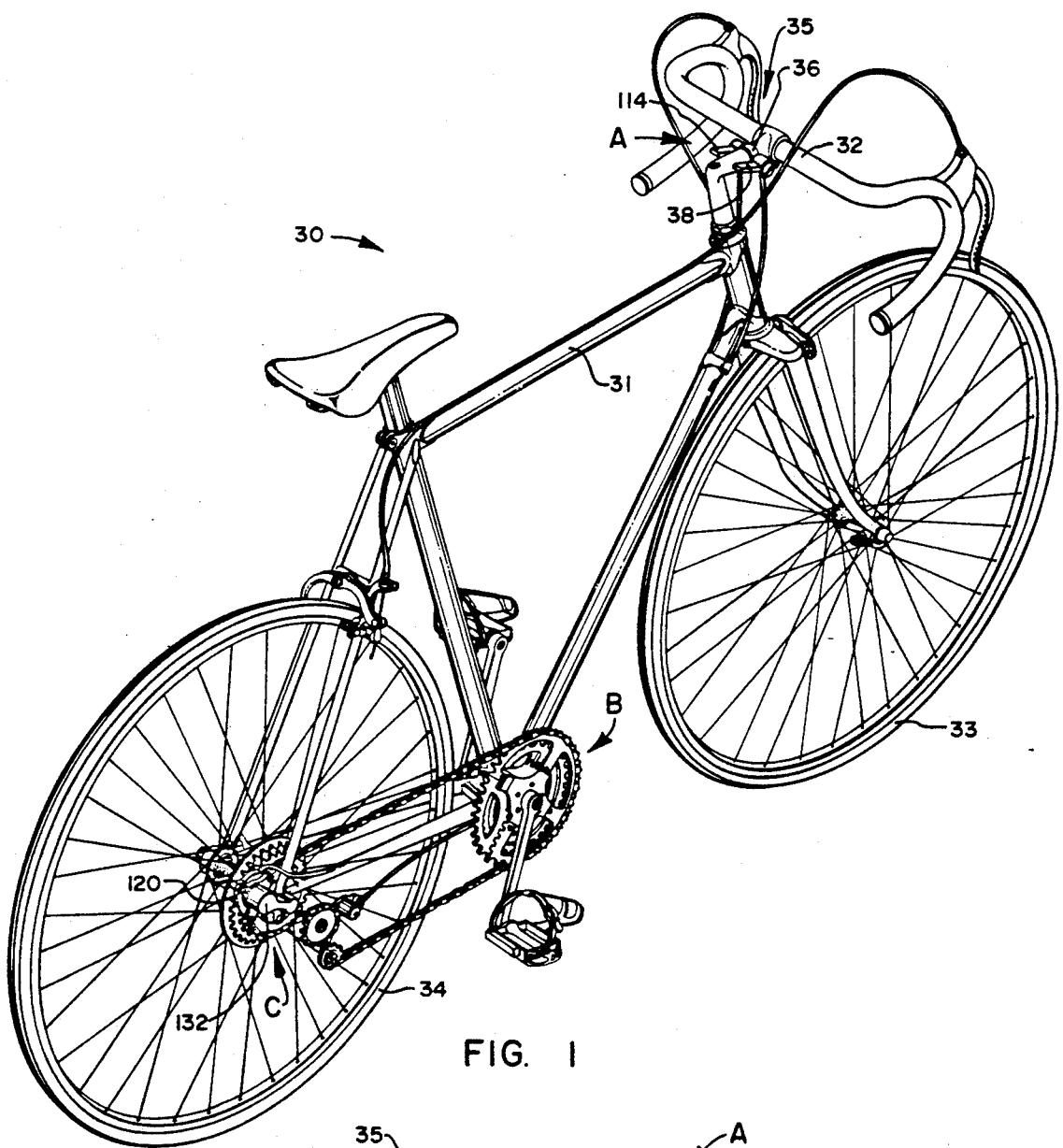

Referring now to the drawings:

In the illustrated preferred embodiment, a bicycle, shown generally at 30, comprises a frame 31, bicycle handlebars 32, front wheel 33 and rear wheel 34.

The shift assembly of the invention is mounted on the bicycle and is made up of three general assemblies. The first assembly is the shifting levers, shown generally at A, FIGS. 1 and 2. The second assembly is the drive sprocket clusters and controls, shown generally at B, FIGS. 1 and 3, and the third assembly is the wheel sprocket cluster and controls, shown generally at C, FIGS. 1 and 10.

Figure 2:
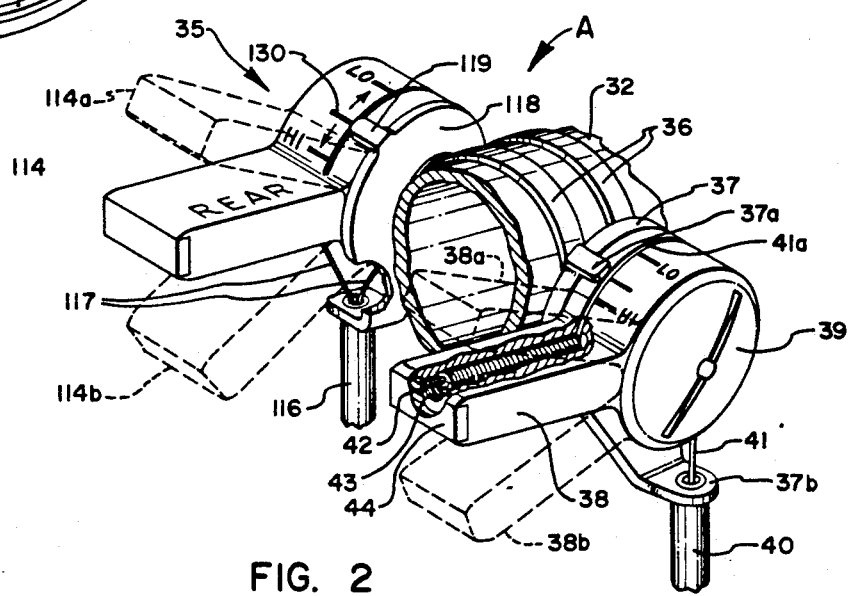

As best shown in FIG. 2, a pair of shifting levers, shown generally at 35, are anchored to the handlebars 32 of the bicycle by means of anchor straps 36. A lever base 37 is attached to straps 36 and has a lever base indicator 37a thereon. A drive sprocket shifting lever 38 is anchored to one lever base 37 by means of a pivot anchor screw 39, and a single cable sheath 40 is attached to an arm 37b of the lever base 37. A cable 41 passes through the sheath 40 wrapping around the lever in a groove 41a and has one of its ends clamped to drive sprocket shifting lever 38 by means of a cable set screw 42. The cable set screw 42 is threaded into hole 43 to clamp the single cable 41 against drive sprocket shifting lever 38. A decorative cover plate 44 is inserted into the end of drive sprocket shifting lever 38 and covers threaded hole 43 to give a finished and decorative appearance to the shifting lever.

In operation, when drive sprocket shifting lever 38 is moved up into its high position shown in dotted lines at 38a the Hi indicator mark on drive sprocket shifting lever 38 aligns with lever base indicator 37a. This causes the drive sprocket cluster and controls, shown generally at B, to reciprocate and a shift is made into the high range of the drive sprockets as will be hereinafter further explained. Likewise, when drive sprocket shifting lever 38 is rotated downwardly into its low position, as shown in dotted lines at 38b, the Lo indicator mark on the lever will align with the lever base indicator 37a and the drive sprocket cluster and controls, shown generally at B, will again reciprocate with a resultant shift into the low range of the drive sprockets, as will be further explained.

When the drive sprocket shifting lever 38 is in the position shown in FIG. 2, the drive sprocket cluster and controls shown at B are operating in the middle range, as will be further explained. When drive sprocket shifting lever 38 is moved to one of the three positions, Hi, Lo or middle, as described, it is maintained in that position by a ball and detent system, not shown.

Figure 3:
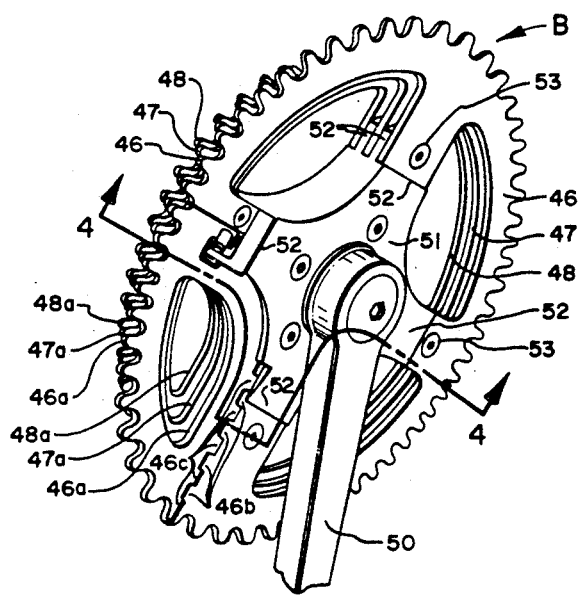

Referring now to FIG. 3, the drive sprocket cluster shown generally at B is comprised of three sprockets. The three sprockets include a large drive sprocket 46, an intermediate drive sprocket 47 and a small drive sprocket 48. Each of the three drive sprockets has a hinged sector shown respectively at 46a, 47a, and 48a, and the hinged sectors are hinged to their respective sprockets by means of interconnected hinge flanges 46b, 47b and 48b and 46c, 47c and 48c. The large drive sprocket hinge flanges 46b alternate with the large drive sprocket hinge sector flanges 46c, and the sector flanges pivot on the axis of the large drive sprocket hinge flanges.

Figures 4, 4A:
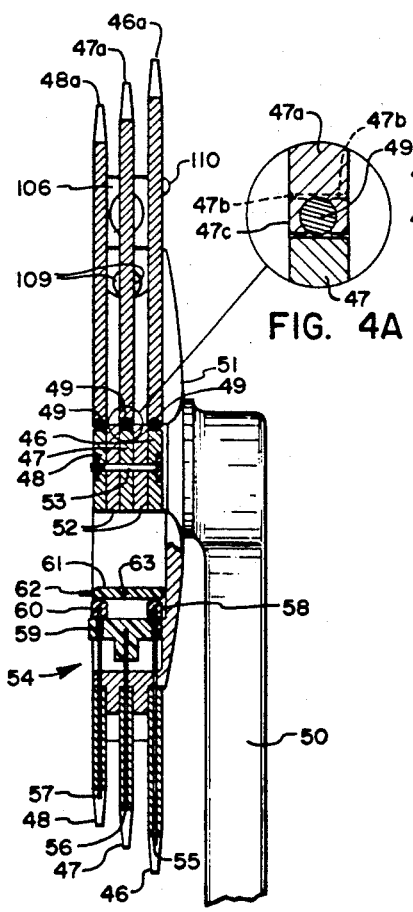

FIG. 4 is a cross section of the drive sprocket clusters and controls, and FIG. 4a is an enlarged fragmentary view exploded therefrom to show how the intermediate drive sprocket 47 is attached to the intermediate drive sprocket hinged sector 47a. A hinge pivot shaft 49 is inserted between intermediate drive sprocket hinge flanges 47b and intermediate drive sprocket hinged sector flanges 47c. Hinge pivot shaft 49 interlocks the intermediate drive sprocket and its hinged sector together, thereby creating a pivot point about which the hinged sector pivots.

A pedal arm 50, FIGS. 3–6, is connected to the drive sprocket base 51, and the drive sprocket base 51 has drive sprocket base extensions 52 which interlock with the large drive sprocket 46, the intermediate drive sprocket 47 and the small drive sprocket 48. The sprockets are locked to the base extensions 52 by means of bolts 53, thereby creating a solid connection.

Figure 5:
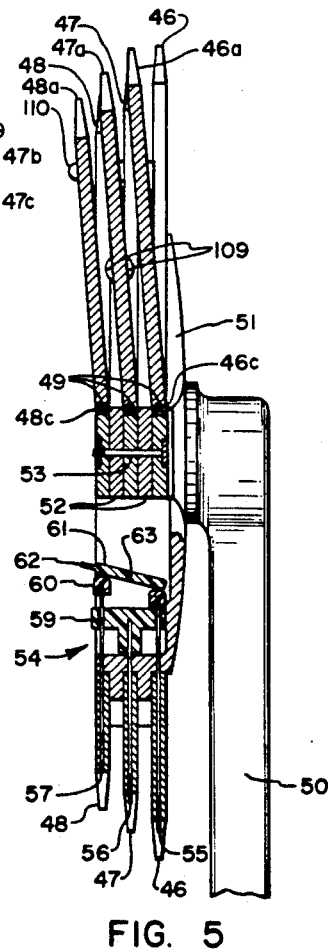
Figure 6:
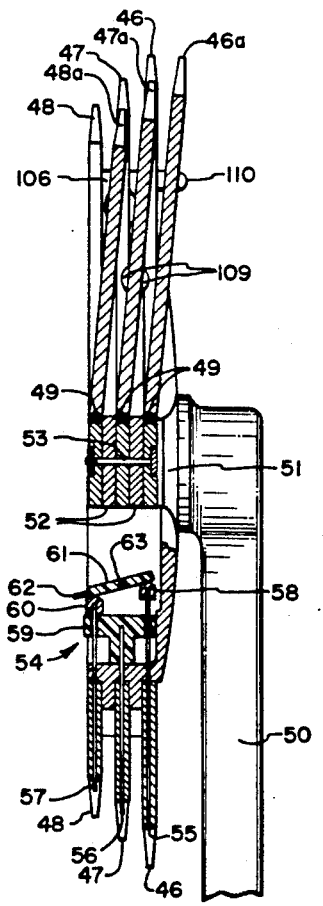

As noted, FIG. 4 is a cross-sectional view taken on the line 4—4 of FIG. 3. As shown, the hinged sectors are in direct alignment with the drive sprockets. Each of the drive sprockets 46, 47, and 48 is equipped with a chain sensing device, shown generally at 54. The chain sensor includes long, intermediate and short push rods 55, 56 and 57, respectively. The push rods 55 and 57 are connected to push rod tabs 58 and 60, respectively, while intermediate push rod 56 is connected to intermediate push rod bar 59. Push rod tabs 58 and 60 act directly upon a trigger 61 having a projecting trigger strike 62. Intermediate push rod bar 59 acts uniformly on the large push rod tab 58 and the small push rod tab 60 to thereby align the trigger transversely to the axes of the push rods. In FIG. 4, the chain sensor rod 56 is forced inwardly by the chain to indicate that the chain is on the intermediate drive sprocket 47. In FIG. 5 which is a cross section similar to FIG. 4, the chain sensor indicates that the chain is on the small drive sprocket 48. Small push rod 57 has been pushed inwardly by the chain and small push rod tab 60 has acted upon trigger 61, thereby causing trigger 61 to rotate about its trigger pilot shaft 63 into an upper incline position with trigger strike 62 fully angled toward the center of the sprocket. Also, as best seen in FIG. 5, the hinged sectors of each drive sprocket have been shifted to the left as viewed in the figure. The hinged sector 46a of large drive sprocket 46 has been shifted to align with intermediate drive sprocket 47. Similarly, intermediate drive sprocket hinged sector 47a has been shifted to align with small drive sprocket 48. In this position the hinged sectors act as a transfer means to move the chain from a smaller drive sprocket to a larger drive sprocket. In FIG. 6 the sprocket hinged sectors 46a, 47a and 48a are shown pivoted in an opposite direction. As shown in FIG. 6, the chain sensing device shown generally at 54 indicates that the chain is on the large drive sprocket because large push rod 55 is depressed by the chain. This causes the large push rod tab 58 to act upon trigger 61 and to pivot trigger 61 about its trigger pivotal shaft 63 until trigger strike 62 is angled away from the center axes of the sprockets and is in the most outwardly extending position. Also, as shown in FIG. 6, the drive sprocket hinged sectors have all been shifted to align the intermediate drive sprocket hinged sector 47a with large drive sprocket 46 and the small drive sprocket hinged sector 48a with the intermediate drive sprocket 47. When intermediate drive sprocket hinged sector 47a is aligned with large sprocket 46 the hinged sector 47a is positioned to receive the chain from the large drive sprocket 46. If the hinged drive sprocket sectors are not returned to alignment with their own respective drive sockets the chain will move on down to the smallest sprocket.

Figure 7:
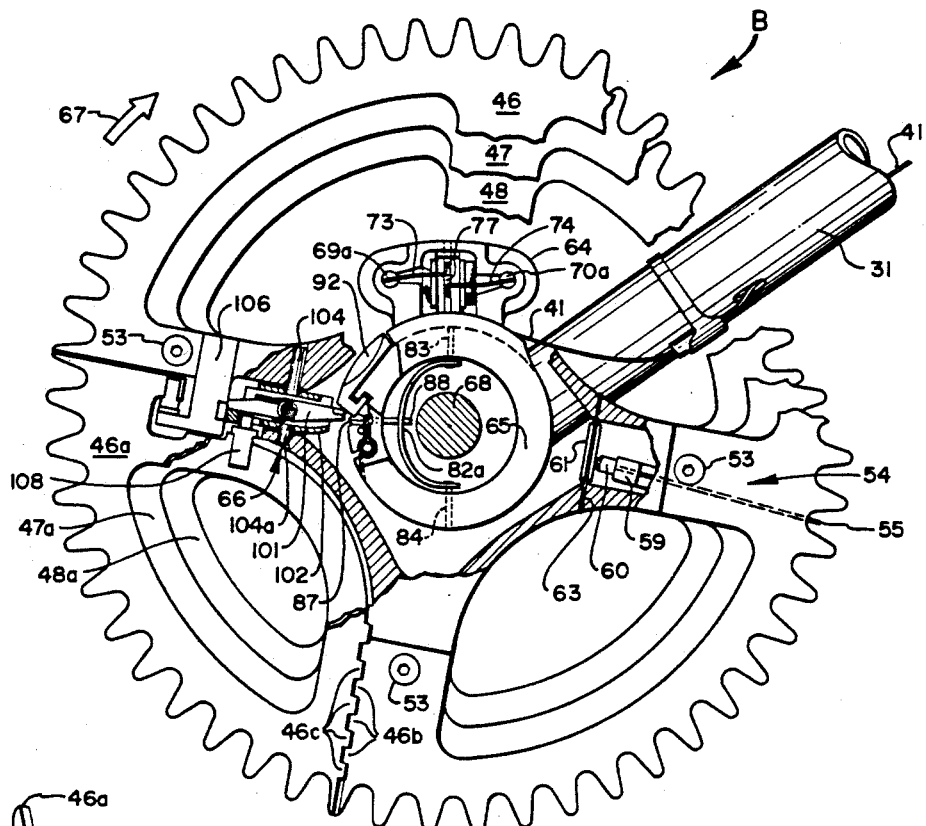

FIG. 7 is an elevation view of the drive sprocket cluster and controls shown generally at B, partially broken away to more clearly show the internal workings of the drive sprocket and the relationship of the parts to one another. The drive sprocket control case housing 64 and a cam support ring 65 are both attached to the bicycle frame 31 in a stationary position. The large, intermediate and small drive sprockets 46, 47 and 48, along with their corresponding hinged sectors 46a, 47a, and 48a and also the means for shifting the hinged sectors, shown generally at 66, along with the chain sensor, shown generally at 54, all rotate in the direction of the rotation arrow 67 in relationship to the sprocket shaft 68. The internal workings of the drive sprocket control case 64 are viewed in FIG. 8, with the control case housing removed, so that the internal workings and their relationship to each other will show more clearly.

Figure 8:
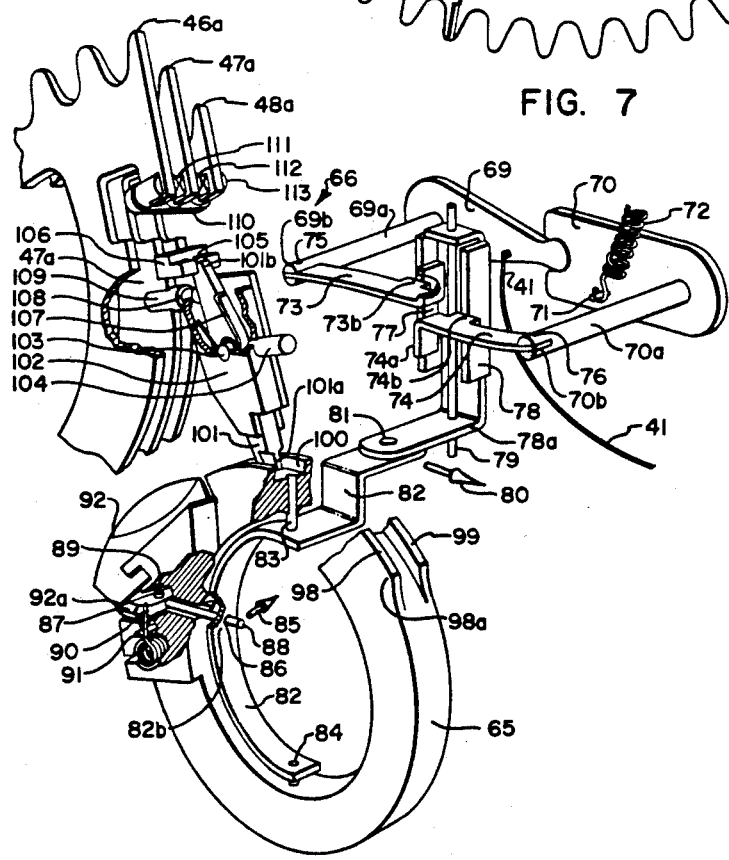
Figure 9:
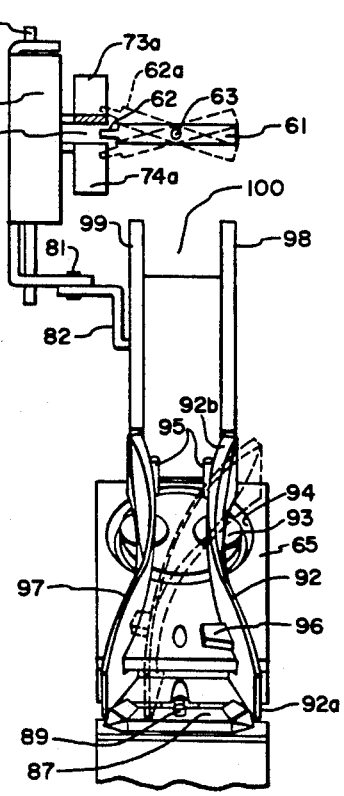

The cam support ring 65, as well as the shifting means for the hinged sectors, shown generally at 66, are also viewed in FIG. 8. Cable 41 is attached to the male rocker arm 69 which is connected by a ball and socket connection with the female rocker arm 70. Thus when cable 41 is actuated by lever 38 (FIG. 1) the male and the female rocker arms respond in unison. The male rocker arm 69 has a shaft 69a with a bifurcated end 69b extending from one side thereof. An index finger 73 is inserted into and held in the bifurcated end by a pivot shaft 75. Similarly, the female rocker arm 70 has an extending shaft 70a with a bifurcated end 70b and a similar index finger 74 which is also attached to the extending shaft with a pivot shaft 76. Index finger 73 has an upward projecting strike 73a. Similarly index finger 74 has a downwardly extending strike 74a. Between the two index finger strikes is a neutral space identified as 77. As best seen in FIG. 9, the trigger strike 62 may pass freely through neutral space 77.

In operation, when lever 38 is moved into its upward position 38a, cable 41 is advanced through cables sheath 40 thereby moving the other end of the cable 41 which is attached to the male rocker arm 69 which interconnects with a female rocker arm 70. A spring 72 biases the rocker arms and has one end attached to the female rocker arm 70 by means of a post 71. The other end of spring 72 (not shown) is attached to the drive sprocket control case housing 64, not shown in FIG. 8. When cable 41 is advanced, spring 72 contracts to raise the connected end of the rocker arms. As male rocker arm 69 and female rocker arm 70 move in an upward position, their extended shafts 69a and 70a with the bifurcated ends holding indexing fingers 73 and 74, respectively, rotate, thereby moving the indexing fingers to an upward position. The neutral space 77, best seen in FIG. 9 becomes occupied by index finger strike 74a that projects as a tab downwardly from finger 74. On the next sprocket revolution, as will be further explained, trigger strike 62 comes in contact with indexing finger strike 74a and pivots the indexing finger strike inwardly about the pivot shaft 76. Indexing finger 74 also has a projection 74b which will push against a motion lever 78. The motion lever 78 then rotates about a shaft 79 held top and bottom by control case 64 and moves in the direction of direction arrow 80. Motion lever 78 leg 78a is connected to a leg 82a of a C-shaped motion bar 82 by means of a pivotal connection 81. Thus, the movement of motion lever 78 also causes movement of the C-shaped motion bar 82 generally in the direction of arrow 85. Because the C-shaped motion bar 82 is pivoted at its ends on pivot shafts 83 and 84 that extend from cam support ring 65, the central portion 82b of bar 82 is pivoted in the direction shown by arrow 85.

A hole 86 is provided through the midpoint of the C-shaped motion bar 82, and cam latch arm 88 extends through hole 86 and moves when the motion bar 82 is moved. As the cam latch arm 88 moves in the direction of direction arrow 85, a cam latch 87 is pivoted around a cam latch pivot shaft 89. When cam latch 87 has moved far enough to clear a cam latching point 92a of an outer cam 92 the outer cam is released and pivots about the axis 93, FIG. 9. To assist the cam in this movement, one end of a cam spring 95 is biased against the end 92b of outer cam 92. The body of the cam spring is held in a circular slot 94 which has been milled into a portion of the cam support ring 65. The movement of the outer cam is limited by a cam limit spacer 96, FIG. 9, which comes in contact with an inner cam 97. Inner cam 97, mounted to move in the same manner as cam 92, is spring biased by the other end of spring 95 and is mounted to extend opposite and spaced apart from cam 92. A fixed outer flange 98 is aligned behind outer cam 92 and extends upwardly from the periphery of the cam support ring 65. Similarly, an inner flange 99 also extends outwardly from cam support ring 65 to be aligned with inner cam 97. A pawl channel 100 is created between the outer cam 92 and inner cam 97 and extends between outer flange 98 and inner flange 99.

In operation, the shifting means, as shown generally at 66, for the hinged sectors contains a pawl 101 that normally travels through pawl channel 100 during rotation of the drive sprockets.

Pawl 101 is pivotally mounted within a pawl sleeve 102 by means of a pin 103, thereby allowing a limited longitudinal rotation of the pawl 101 within the pawl sleeve 102. The pawl sleeve 102, in turn, is pivotally mounted on studs 104 and 104a which project from the opposing walls of a recess 51a in drive sprocket base 51. The pawl sleeve 102 is thus allowed a limited lateral rotation within recess 51a. Pawl spring 107 is mounted between the pawl 101 and the pawl sleeve 102, biasing the pawl 101 in a counterclockwise direction, FIG. 8. Normally upper pawl end 101b is forced into notch 105. Notch 105 is formed in a hardened piece of steel which is welded into bearing block 106, thereby becoming part of bearing block 106. Bearing block 106 is permanently affixed to the drive sprocket base 51 by rivets. The lateral rotation of the pawl sleeve 102 controls the shifting positions of hinged sectors 46a, 47a and 48a by its interconnections thereto, as explained below. Thus, when the upper end 101b of the pawl 101 is in notch 105 all lateral movement of the pawl sleeve 102 is prevented and the hinged sectors 46a, 47a and 48a are locked in a nonshifting, normal operating position. However, either the inner cam 97 or the outer cam 92, as previously noted, can be pivoted into the pawl channel. If the outer cam 92 is pivoted into pawl channel 100, as the sprocket rotates in direction 67 pawl 101 will strike the outer cam 92 with its pawl strike surface 101a. Outer cam 92 will not move at this point and pawl 101 is pivoted within pawl sleeve 102 around pawl pivot 103. Pawl end 101b is rotated outwardly against the bias of pawl spring 107 from a notch 105 in bearing block 106.

With the pawl end 101b released from notch 105, the pawl sleeve 102 is free to rotate laterally around the studs 104 and 104a and continues to slide along the outer cam 92. The outer cam 92 has a curved surface which rotates the pawl 101 away from pawl channel 100 until the pawl passes the cam axis 93. At this point, the pawl has passed the low point of the outer cam and as its movement along the cam continues it overrides the outer cam by moving outer cam 92 against the bias of cam spring 95. The end 92a of the cam 92 is thus moved to a point beyond cam latch 87 which locks the cam in its open position, thereby creating a clear pawl channel 100 between inner cam 97 and outer cam 92. Thus, the pawl 101 is put in its pivoted position and the pawl sleeve 102 is pivoted around the pawl sleeve studs 104 and 104a which are mounted within the recess 51a. As this occurs, a thrust stirrup 108, which is pivotally connected to pawl sleeve 102, has bifurcated ends 109 which engage intermediate drive sprocket hinge sector 47a. The intermediate hinge sector 47a is also interlocked with the large hinged sector 46a and the small hinge sector 48a by means of a common stirrup bar 110 having three individual stirrups 111, 112 and 113, each including bifurcated ends which interlock hinge sectors 46a, 47a and 48a, respectively, into the position shown in FIG. 5 out of alignment with their associated drive sprockets.

As the pawl end 101a in its further rotation moves beyond the end 92b of the cam 92, it, together with the pawl sleeve 102, is held in a laterally rotated position by the outer surface of the rail 98 and are so held until paul end 101a moves beyond the end 98a of the rail 98. Thus, the hinged sectors 46a, 47a and 48a are held in a pivoted shifting position for sufficient sprocket rotation to occur to allow the chain, which in the present description is in driving engagement with sprocket 47, to engage hinged sector 46a. During the next approximate 180° of sprocket rotation, the hinged sectors 46a, 47a and 48a are held in the shift position by the driving engagement of the chain with sprocket 47, hinged sector 46a and sprocket 46. When hinged sector 46a rotates out of mesh with the chain, sector 46a is then free to return to the normal running position. This is accomplished on the further rotation of the sprocket cluster when pawl end 101a engages the inner surface of cam 92, which is in its normal latched position. The pawl 101 is thus moved to its central position where pawl end 101b snaps back into notch 105.

On a next revolution of the drive sprockets, no further shifting will take place and pawl 101 will again track through the pawl channel 100, thereby maintaining the alignment of the hinged sectors with the drive sprockets. At the same time trigger strike 62, which is now in position 62a, again will pass through the neutral position 77 between the index finger strikes 73a and 74a, which are now in a higher position.

The movement of the chain from the intermediate position to the high range, as shown on the shift lever 38, in FIG. 2, has been described. In moving from the high position 38a, shown in FIG. 2, all the way to the low postion shown at 38b, a similar operation is practiced. In this case, however, the process takes place twice since the chain sensor does not align the trigger strike 62 with the neutral space 77 until the operation has been completed twice.

Figures 10, 11:
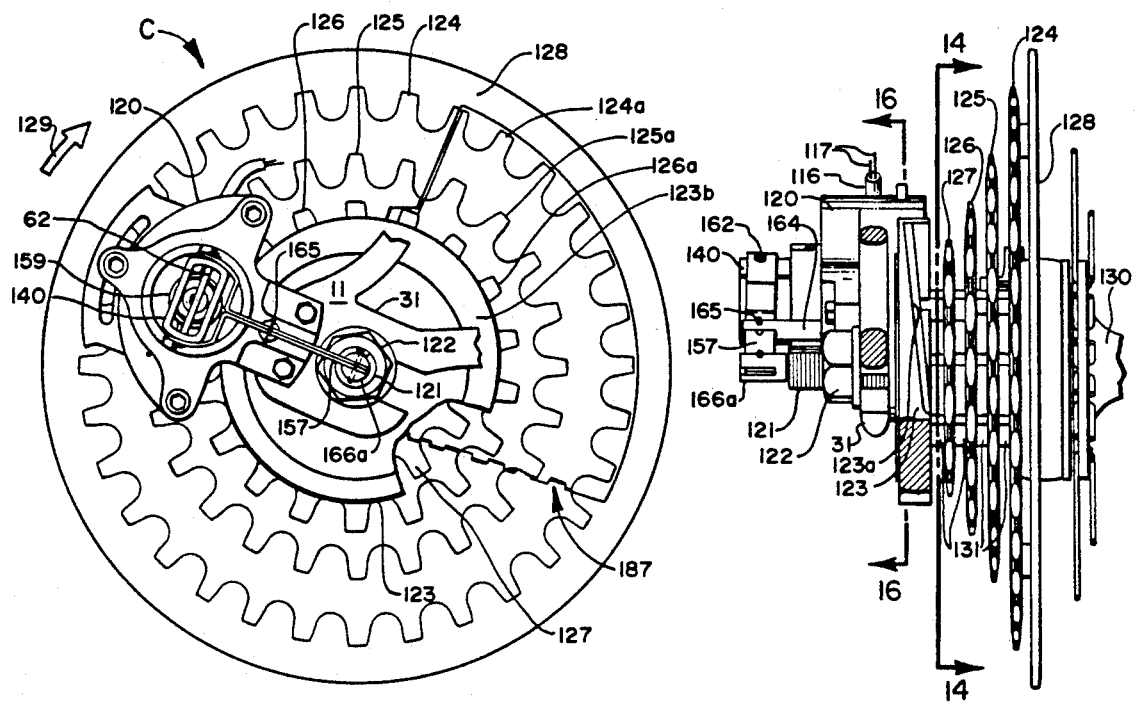

The shifting lever for the rear wheel sprocket cluster is shown in FIG. 2 and FIGS. 10-18 show, in detail, the rear wheel sprocket cluster and controls. A rear wheel control lever 114 is shown in FIG. 2. Attached to lever 114 is an endless cable 117 that slides within a cable sheath 116 that is attached to the lever base 118. Lever base 118 also has an indicator 119 thereon. Endless cable 117 passes around and is fixed to lever 114 by a set screw similar to the set screw used to hold cable 41 to the drive sprocket shifting lever 38. When the rear shifting lever 114 is raised to the dotted line postion 114a, the rear shifting sprocket and controls reciprocate responsive to the movement and a shift is made into a desired higher sprocket ratio. Conversely, when lever 114 is moved downward to the position 114b, shown in dotted lines, the rear shifting sprocket and controls respond by moving the chain to a lower sprocket ratio. As best seen in FIG. 10, a control housing 120, rear wheel axle 121 and rear wheel nut 122 are all locked into a stationary position with respect to the bicycle frame 11. Cam disc and chain retainer 123, rear wheel large sprocket 124, rear wheel large intermediate sprocket 125, rear wheel intermediate sprocket 126, rear wheel small sprocket 127 and rear wheel large chain retainer 128 all rotate during forward travel around the rear wheel axle 121 in the direction of arrow 129. The smallest sprocket 127, not clearly visible in FIG. 12 because its diameter is smaller than the diameter of the cam disk and chain retainer 123, is shown in FIG. 11. Also, as best viewed in FIGS. 11 and 12, cam and disk chain retainer 123 includes a recessed section 123a that receives the pivoted hinged sector 127a. Dust covers 131 which separate the sprockets and keep foreign matter from going through the internal workings of the sprocket cluster are best seen in FIG. 11.

The rear wheel lever 114 (FIG. 2) always returns to the neutral position immediately after a shift either to the high or low indicator has been made. The neutral position is indicated by the midmark 130 between the Hi and Lo marks on lever 114. When this midmark 130 is aligned with the base indicator 119, the lever is in the neutral position. In shifting to a high range of sprockets, lever 114 is moved to and is held in the dotted line position 114a. After shifting occurs lever 114 is released and automatically returns to its neutral position. A similar action occurs when lever 114 is moved into its lower position 114b. When the shift is completed lever 114 is released to automatically return from the lower position to the neutral position.

Figure 13:
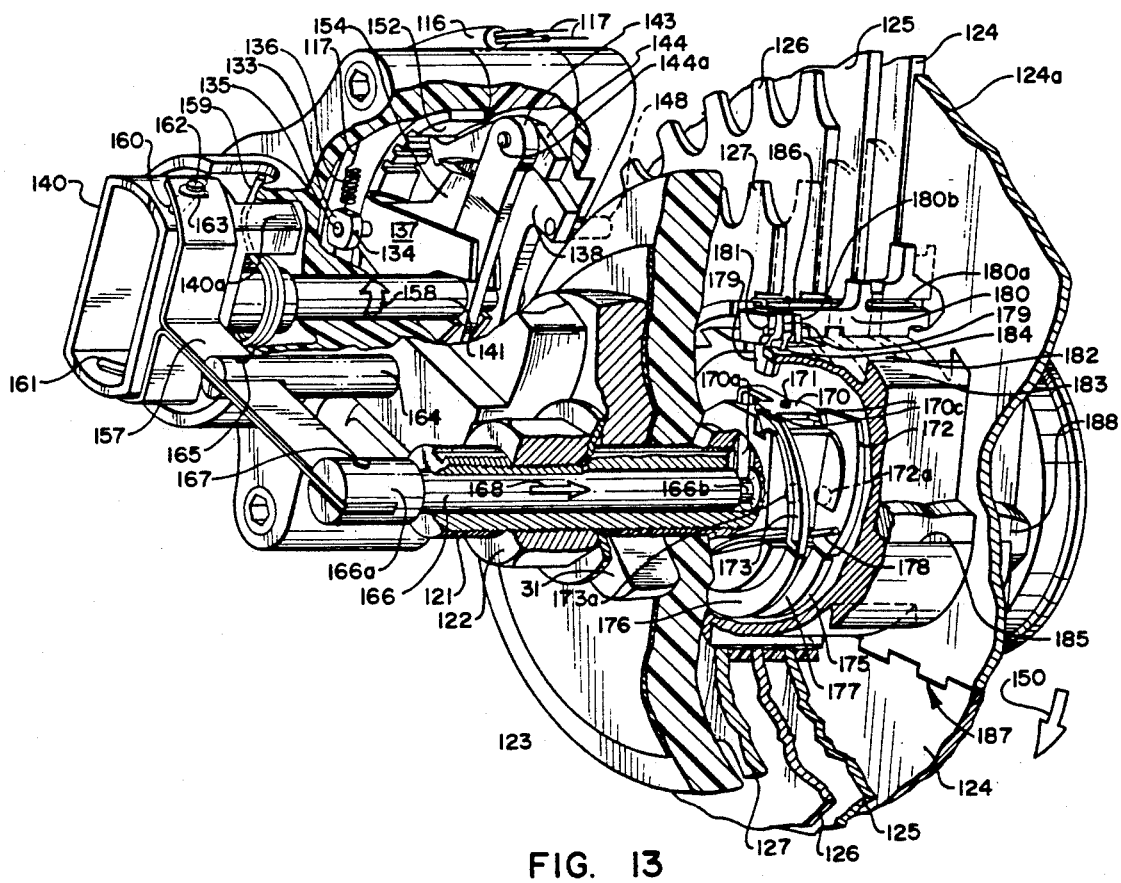

As shown in FIGS. 13-18, cable sheath 116 and endless cable 117 enter the rear wheel control housing 120. As shown in FIG. 16 when the wheel shifting lever 114 is in its neutral position there is no stress on endless cable 117. The endless cable 117 is anchored along its length at two locations, i.e. at rear shifting lever 114, as previously described, and also as best seen in FIG. 13, at the upper left-hand side of an anchor block 133 that is swaged onto cable 117 just beyond spring 136. The spring 136 is a continuous part of cable 117. The anchor block 133 is positioned on a shaft 135 and is anchored to the shaft by means of a pin 134. Shaft 135 passes through yoke 137 (FIGS. 15 and 16) and fits into notch 139 which is on connecting yoke 138. Connecting yoke 138 is slip fitted over a motion translator shaft 141, and a dog bar 143 (FIG. 15 and 16) is firmly attached to motion translator shaft 141.

The dog bar 143 has dogs 144 and 145 at opposite ends thereof. In FIG. 16, the dogs are shown in their neutral positions. When lever 114 is moved into its lower position 114b, as shown in FIG. 2, the internal control parts are moved as shown in FIG. 17. Direction arrows 146 and 147 (FIG. 17) show the path that the endless cable 117 is taking because of the tension being applied to cable 117 through lowering of lever 114 to position 114b. Since shaft 135 is firmly anchored to cable 117, upon movement of cable 117, shaft 135 pushes against notch 139 of connecting yoke 138 and causes the connecting yoke 138 to rotate about a motion translator shaft 141. Connecting yoke 138 is rotated out of the way of dog 145, and dog 145 pivots about a pivotal connection shaft 145a. Spring 151 braces the back surface of dog 145 and helps pivot the dog as a foot 145c of the dog slides on top of connecting yoke 138.

Projecting stud 149, located on yoke 138, is rotated close to the camming surface of cam disk 123 during movement of lever 114 to position 114b. Direction arrow 150 (FIG. 14, 17 and 18) shows the direction of rotation of cam disk 123. Cam disk 123 has an elongate cam surface 123b (FIGS. 16-18) which is moving in the path of rotation arrow 150.

When the elongate cam surface 123b comes in contact with the projecting stud 149 on yoke 138, the yoke is again pivoted up about its axis on motion translator shaft 141. Dog 145, which is then positioned on yoke 138, causes dog bar 143 to pivot along with the translator shaft 141 to which dog bar 143 is attached. Dog tooth 145b engages teeth on index arch 152, and as the dog is rotated so is the index arch. The index arch has a longer pivotal radius than the dog 145. Because of this, the teeth on index arch 152 will push dog tooth 145b out of index arch teeth 152. This pushing action on the dog tooth 145b causes the dog to again pivot around its pivotal connection 145a and causes dog foot 145c to move clear of yoke 138, (FIG. 18). A disconnect yoke 154 has then raised pin 135 out of notch 139, yoke 138 is free to again return to its neutral position and will prevent engagement of dog 145 with the index arch 152. The disconnect yoke 154, shown best in FIG. 17A, raised by dog bar 143, pivots against its extending fingers 154a. The extension of the extending finger 154a over ledge 155 of control housing 120 is best illustrated in FIG. 15. As the dog bar 143 returns to its neutral postion, so does disconnect yoke 154. The index arch 152 carries a pin 152a which engages index indicator 153. The index indicator has marks which align with marks on the control housing to show the position of chain relative to the rear wheel sprockets. Index arch 152 is held in position by a tension spring 152b acting in a pressure point 156 which engages in a series of notches along the side of indexing arch 152. The tension spring 152b is shown best in FIG. 15.

Figure 14:
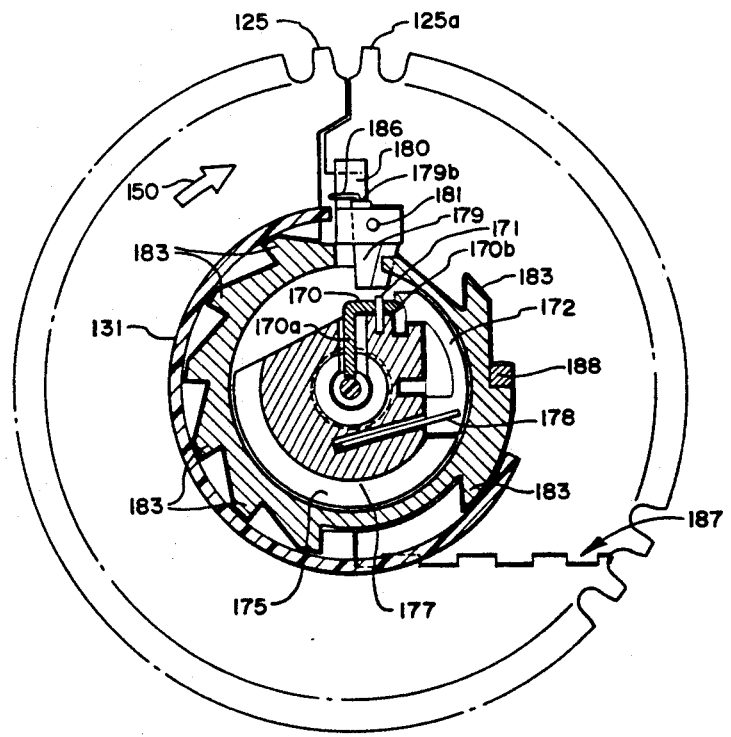

In operation and with particular reference to FIG. 13, the motion translator shaft 141 is moved by the dog bar 143 in the direction of rotation arrow 158. At the same time, motion translator 140, which is fixed at the end of motion translator shaft 141, is also rotated. Motion translator 140 has a projecting finger 140a which acts against the bias of the motion spring 159. Motion translator 140 also contains two slots 160 and 161. Passing through these slots is an action shaft 162 that is connected to the yoke end 157 by retainer clamps 163. As the motion translator rotates, action bar 162 slides within the slots 160 and 161. The slots are in opposite directions and cause motion bar 157 to move. If motion translator shaft 141 is rotated in the direction of arrow 158, the yoked end of motion bar 157 will move outwardly away from the rear wheel cluster sprockets and control housing 120. Motion bar 157 pivots about a pivot pin extending through the bar 157 and an anchor stud 164 which has a bifurcated end to receive the motion action bar 157. To lock the motion bar to the anchor stud, a pivot pin 165 is used. Motion bar 157 continues on until it meets axle rod 166. Axle rod 166 has a bifurcated end 166a which receives motion bar 157. A pivot pin 167 ties motion bar 157 and the bifurcated end of the axle rod 166a together. As observed in FIG. 15, when motion bar 157 moves inwardly or along the path indicated by motion arrow 168, axle rod 166 also moves inwardly. Likewise, when motion bar 157 moves outwardly or in the direction of motion arrow 169, axle 166 reciprocates and moves outwardly also. As shown in FIG. 13 and 14, axle rod 166 has an axle rod groove 166b formed therein into which a cam latch extension 170a extends. As axle rod 166 moves in the direction of motion arrow 168 cam latch 170 is pivoted by cam latch extension 170a about a cam pivot shaft 171. As this occurs, cam latch point 170c is rotated away from an outer cam 173. When cam latch point 170c clears cam 173, the cam is pivoted about the cam pivot 173a by a cam spring 178. As the pivoting occurs, cam 173 blocks a cam channel 177. Normally, rear wheel pawl 179, FIG. 13, tracks through channel 177 unobstructed, but when the channel is blocked by outer cam 173, the rear wheel pawl has a strike surface 179a which strikes the cam and rotates the pawl 179 out of a pawl locking notch 184 which is part of the sprocket hub 182. An action bar 180 has two extending flanges 180b and the rear wheel pawl 179 is positioned between these flanges and is locked thereto by a pin 181 that passes through the flanges and the pawl. Movement of the pawl biases a pawl spring 186. One end of pawl spring 186 is attached to the pawl and the other end passes through a hole in the action bar and fits into a groove 180a in the action bar 180. When rear wheel pawl 179 swings out of pawl notch 184 after striking the pawl cam 173, action bar 180 begins to slide as the pawl is pulled outwardly along the cam surface. As pawl 179 passes cam pivot 173a, the pawl biases cam 173 against spring 178 to recock the cam and to allow the cam latch 170 to once again come into play and hold the cams in their open position. The pawl continues to pass cam 173 and ride on the outer surface of rear wheel outer cam flange 176. Pawl 179, in this position, has moved action bar 180, which in turn has caused the hinged sectors of the rear wheel sprockets to pivot about their hinged connections, shown generally at 187. The hinge is the same type of hinge previously described for the drive sprockets. The hinge sectors 124a, 125a, 126a and 127a are assisted in supporting the force applied by the chain by the bearing shoe 188. The bearing shoe has a curved cam or sliding surface on which the hinged sectors rest while in hinge shifting position. With the hinged sectors moved outwardly away from the bike frame, the chain is shifted down to a smaller gear sprocket or high gear range. Similar to front drive sprocket, the hinged sectors in rear are held open by rail 176 long enough for chain transfer to take place and cam is returned to middle locked position by front cam surface. A complete movement of the chain from one sprocket to another on the rear wheel sprockets has been described. If it is desired to move the chain to another sprocket, lever 114 is again moved and the process repeats itself.

Figure 12:
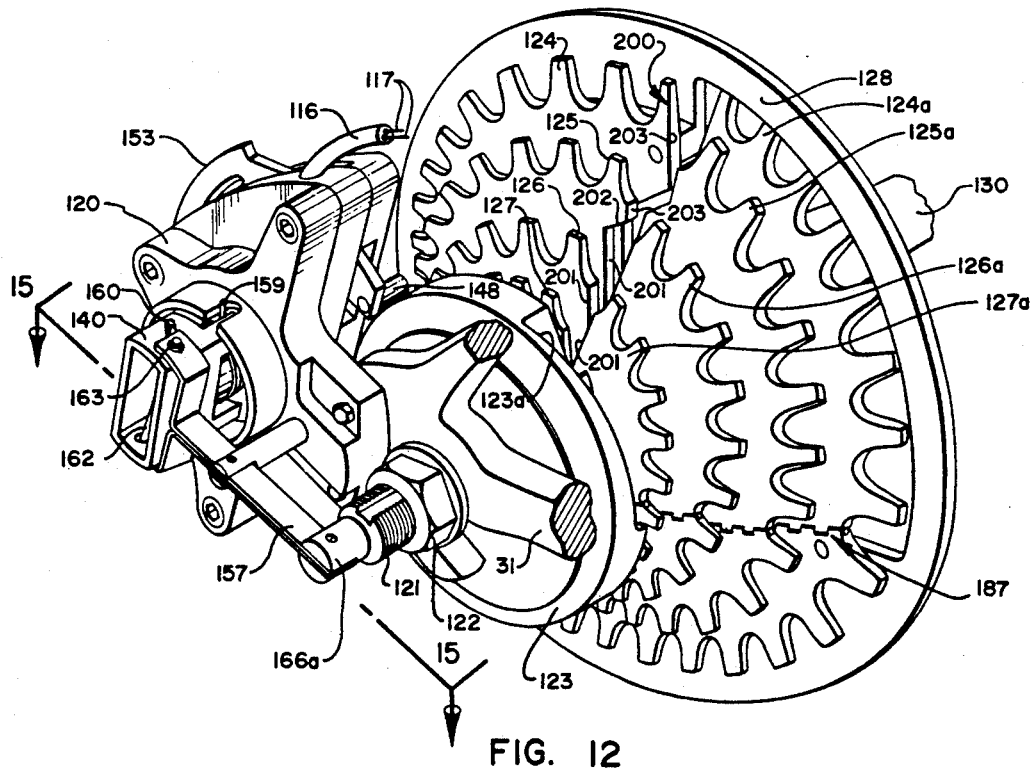

It has been found that when more than two sprockets are provided to receive the chain, special care must be taken to insure proper alignment of the sprocket teeth with the chain as the chain changes from one sprocket to the other. The sprockets can be modified, as shown in my U.S. Pat. No. 4,127,038 by deepening the grooves, but a more preferred method of insuring proper chain and sprocket engagement is to stagger the break lines forming the pivoted segments as necessary such that the straight break line between adjacent sprockets passes through the centers of aligned teeth, grooves, or teeth and grooves. Thus, as best shown in FIG. 12, the break line shown generally at 200 is formed by breaking the two adjacent pivoted segments of smaller sprockets on line 201 through sprocket notches, and then staggering the break line at 202 to continue it at 203 through sprocket teeth of adjacent larger sprockets. With the break line so formed the chain connectors will properly fit into notches as the chain changes from transfer sprocket to receiving sprocket. It should be noted that a symmetrical relationship is maintained between adjacent rows of sprockets having pivoted segments, with the break line then extending groove to groove, tooth to tooth, tooth to groove, or groove to tooth of the pair of adjacent sprockets.

Although a preferred form of my invention has been herein disclosed, it is to be understood that the present disclosure is by way of example and that variations are possible without departing from the subject matter coming within the scope of the following claims, which subject matter I regard as my invention.

I claim:

1. A shift mechanism for a bicycle or the like comprising
   a drive sprocket assembly including at least one drive sprocket;
   means for rotating each drive sprocket;
   a wheel sprocket assembly including at least one sprocket;
   a chain interconnecting a sprocket of the drive sprocket assembly and a sprocket of the wheel sprocket assembly;
   at least one of the sprocket assemblies including at least two sprockets of different diameters;
   means for pivoting at least a segment of one of said two sprockets to place the teeth of said pivoted portion of one of said two sprockets in alignment with teeth of the other of said two sprockets;
   a movable guide channel;
   a guide pawl;
   means attaching the guide pawl to the pivoted segment;
   means for positioning the guide channel according to the sprocket on which the chain is to be entrained; and
   means directing the pawl through the guide channel whereby the position of the pawl as it passes through the guide channel determines the position of each pivoting segment of a sprocket.

2. A shift mechanism as in claim 1, wherein the guide channel includes
   inner and outer cam surfaces forming walls of the guide channel.

3. A shift mechanism as in claim 2, wherein the means for positioning the guide channel includes
   a cable;
   means connecting one end of the cable to an operator controlled lever;
   linkage means interconnecting the other end of the cable and one of the inner and outer cam surfaces; and
   spring means biasing the guide channel to a biased position.

4. A shift mechanism as in claim 2, wherein the means for positioning the guide channel includes
   a cable;
   a cam disc intermediate to the length of the cable; and
   a spring biasing a cam surface forming a wall of the guide channel; and
   linkage means actuated by the endless cable and cam disc to release the spring biased cam surface.

5. A shift mechanism as in claim 1, further including means to sense the sprocket on which the chain is positioned.

6. A shift mechanism as in claim 5, wherein the means to sense the sprocket on which the chain is positioned comprises
   parallel rods extending through the sprockets; and
   a trigger pivotally mounted to be engaged by the rods whereby the tilt of the trigger is indicative of the position of the chain.

7. A shift mechanism as in claim 5, wherein the means for positioning the guide channel includes
   a cable;
   means connecting one end of the cable to an operator controlled lever;
   linkage means interconnecting the other end of the cable and one of the inner and outer cam surfaces; and
   spring means biasing the guide channel to a biased position.

8. A shift mechanism as in claim 7 wherein the linkage means includes
   a first pivoted rocker arm connected to the cable;
   a second rocker arm pivotally engaging said first rocker arm;
   spring means biasing the rocker arms to a first position;
   an index finger fixed to each rocker arm and pivotable with said rocker arms, said index fingers being spaced apart whereby in one position of said index fingers the means sensing the sprocket on which the chain is positioned will pass therebetween; and
   a rotating linkage, engageable by the index fingers and connected to pivot a cam surface of the guide channel.

9. A shift mechanism as in claim 6 wherein the linkage means includes
   a first pivoted rocker arm connected to the cable;
   a second rocker arm pivotally engaging said first rocker arm;
   spring means biasing the rocker arms to a first position;
   an index finger fixed to each rocker arm and pivotable with said rocker arms, said index fingers being spaced apart whereby in one position of said index fingers the trigger will pass therebetween; and
   a rotating linkage, engageable by the index fingers and connected to pivot a cam surface of the guide channel.

10. A shift mechanism as in claim 1 wherein each pivoted portion of adjacent pairs of sprockets having pivoted portions is formed with a break line extending through the adjacent sprockets either tooth to tooth, groove to groove, tooth to groove or groove to tooth.

11. A cluster of sprockets comprising at least three sprockets having alternating teeth and grooves therearound of different diameters and each including a pivoted segment, the said segments being formed with a common break line such that the portion of break line at each adjacent pair of sprockets extends as a straight line through the sprockets either tooth to tooth, groove to groove, tooth to groove or groove to tooth and with the break line for each adjacent pair of sprockets being offset from the break line for each pair of sprockets adjacent thereto and with the break line at the sprocket of each pair common to both pairs having a staggered break line such that a portion of said staggered break line is common to each pair of sprockets.

* * * * *